(12) United States Patent
Warkentin et al.

(10) Patent No.: US 10,853,284 B1
(45) Date of Patent: Dec. 1, 2020

(54) SUPPORTING PCI-E MESSAGE-SIGNALED INTERRUPTS IN COMPUTER SYSTEM WITH SHARED PERIPHERAL INTERRUPTS

(71) Applicant: VMware, Inc., Palo Alto, CA (US)

(72) Inventors: Andrei Warkentin, Cambridge, MA (US); Ye Li, Cambridge, MA (US); Alexander Fainkichen, Southborough, MA (US); Cyprien Laplace, Cambridge, MA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/518,818

(22) Filed: Jul. 22, 2019

(51) Int. Cl.
*G06F 13/26* (2006.01)
*G06F 13/42* (2006.01)

(52) U.S. Cl.
CPC .......... *G06F 13/26* (2013.01); *G06F 13/4282* (2013.01); *G06F 2213/0026* (2013.01)

(58) Field of Classification Search
CPC ................ G06F 13/26; G06F 13/4282; G06F 2213/0026
See application file for complete search history.

(56) References Cited

U.S. PATENT DOCUMENTS

| 2015/0143016 A1* | 5/2015 | Egi | ..................... G06F 13/4221 710/313 |
| 2015/0293873 A1* | 10/2015 | Shao | ................... G06F 13/4045 710/314 |

OTHER PUBLICATIONS

Arm Limited: "GICv3 and GICv4 Software Overview," DAI 0492B, 2016, pp. 1-50.

* cited by examiner

*Primary Examiner* — Ernest Unelus
*Assistant Examiner* — Ronald T Modo
(74) *Attorney, Agent, or Firm* — Kim & Stewart LLP

(57) ABSTRACT

A method of handling message signaled interrupts in a computer system that uses an internal bus for communication between peripheral devices, using shared peripheral interrupt (SPI) vectors. The method includes determining whether a message signaled interrupt (MSI) needs to be allocated for a PCI-e device for an interrupt to be sent to a host. If it is determined that MSI needs to be allocated for the PCI-e device, a determination is made as to whether a Locality Specific Interrupt (LPI) register or an Interrupt Translation Service (ITS) is available to process the interrupt. If it is determined that neither the LPI register nor the Interrupt Translation Service (ITS) is available to process the interrupt, the PCI-e device is configured for SPI-based MSI generation to route the interrupt by determining an available SPI vector and assigning the available SPI vector to the PCI-e device.

20 Claims, 6 Drawing Sheets

```
for (i = GIC_SPI_BASE; i < gicd ->nrExes; i++) {
  uint8 readPrio = GetPriority(Gicd ->distBase, i);
  If(readPrio! = DEFAULT_PRIORITY) {
  /*
  * We will not be able to read the priority (it will read
  * 0) for SPIs routed to secure mode.
  */
  ReserveAsUnusable(i);
  }
```

SUPPORTING PCI-E MESSAGE-SIGNALED INTERRUPTS IN COMPUTER SYSTEM WITH SHARED PERIPHERAL INTERRUPTS

BACKGROUND

Peripheral Component Interconnect Express®, officially abbreviated as PCI-e or PCIe, is a high speed serial component expansion bus standard, which is designed to replace older bus standards, such as PCI, PCI-X (PCI extended), and AGP (Accelerated Graphics Port) bus standards. PCI and PCI-X are sometimes referred to as Parallel PCI in order to distinguish them from PCI-e, which is a serial, lane-based architecture.

PCI-e is considered to be an improvement over PCI, PCI-X, and AGP in that it has a higher maximum system bus throughput, lower I/O pin count, and smaller physical footprint. The PCI bus uses a shared parallel bus architecture, in which the PCI host and all devices on the PCI bus share a common set of address, data and control lines. In contrast to this parallel bus architecture, PCI-e uses a point-to-point topology, with separate serial links connecting every device to a root complex, or host, in a single direction (not duplex). Because of the shared bus topology, access to the PCI bus is arbitrated, and limited to one device at a time. In contrast, due to the point-to-point topology, PCI-e supports full duplex communication between any two devices on the PCI-e bus.

One capability of devices connected to a PCI-e bus is the ability to deliver Message-Signaled Interrupts (MSIs), instead of relying on a few legacy PCI-based interrupts that are level-triggered interrupts provided on shared lines. Traditionally, a device has an interrupt line (pin) that it asserts when it wants to signal an interrupt to the host processing environment. This traditional form of interrupt signaling corresponds to out-of-band signaling since it uses a dedicated path to send an interrupt request, separately from the main data path. MSI replaces those dedicated interrupt lines with in-band signaling, by exchanging special messages that indicate interrupts through the main data path. In particular, MSI allows the device to write a small amount of interrupt-describing data to a special memory-mapped Input/Output (MMIO) processor.

The PCI bus includes four interrupt lines, all of which are available to each device. However, the four interrupt lines are not wired in parallel as are the other PCI bus lines. The positions of the PCI bus interrupt lines rotate between slots, so what appears to one device as an INTA # (e.g., an interrupt on a first of the four PCI bus interrupt lines) is an INTB # (e.g., an interrupt on a second of the four PC bus interrupt lines) to the next device and an INTC # (e.g., an interrupt on a third of the four PC bus interrupt lines) to the next device after that one, and so on. Single-function devices use their INTA # line for interrupt signaling, so the device load is spread fairly evenly across the four available interrupt lines, in order to alleviate a common throughput problem that may occur with sharing interrupts.

Due to the shared nature of the PCI bus, PCI interrupt lines are level-triggered and are not edge-triggered, since edge-triggered interrupts may be missed on a shared interrupt line such as utilized in PCI. In contrast, a level-triggered interrupt is set to and remains at a high level (e.g., 5 volts) until that interrupt is serviced, whereby the interrupt line is then set to a low level (e.g., 0 volts). Accordingly, the chances of missing a level-triggered interrupt by a host are very low.

In contrast to the use of shared interrupt lines on a PCI bus, PCI-e does not have physical interrupt lines at all, but instead it uses MSIs. Traditionally, for modern ARM®64 processor platforms, Locality-Specific Peripheral Interrupts (LPIs) are used for processing MSIs according to the Generic Interrupt Controller Version 3 (GICv3) specification, whereby LPIs are typically handled via an Interrupt Translation Service (ITS) block that can be used as an MSI target for a device. FIG. 1 shows an interrupt processing system 200 that uses an ITS 110. ITS 110 is notified of an interrupt request sent by a peripheral device based on an interrupt request sent to a particular register accessible by ITS 110. A device table 120 is access by ITS 110 to identify one of a plurality of interrupt translation tables 125 to use, based on a device vector included in the interrupt request. Based on the selected interrupt translation table, ITS 110 obtains routing information for the interrupt received from the peripheral device from a collection table 130, and ITS 110 forwards the LPI with the appropriate routing information to one or more redistributors 140*a*, 140*b*, ..., 140*n*, for informing a component of the computer system (e.g., processor core) that will handle the interrupt.

Systems without an ITS, or non-monolithic implementations, may use an interrupt standard set forth in the GICv3/GICv4 specification. Such implementations use a GICv3 redistributor SETLPI register as the MSI target for a PCIe device, also known as LPI direct injection. SETLPI is a register that, when written with the LPI vector, will set the LPI vector as pending, for informing a component of the computer system (e.g., processor core) that will handle the interrupt.

Additionally, if there is a problem with an LPI implementation of a computer system, or if a computer system does not have a functioning LPI, then neither ITS nor LPI direct injection can be used for interrupt processing. For example, a device issue raised by way of an interrupt cannot be triaged in such a case where ITS and/or LPI are not existent or are experiencing an operational problem.

SUMMARY

One or more embodiments are directed to using SPI injection capabilities to provide MSI support in a computer system when neither ITS nor LPI direct injection can be used for MSI processing. In a similar manner to SETLPI, SETSPI is a GICv3 distributor register, that when written with an SPI vector, will set the SPI vector as pending, for informing a component of the computer system (e.g., processor core) of an SETSPI-based MSI that it will have to handle.

One or more embodiments provide a method of handling message signaled interrupts in a computer system that uses an internal bus for communication between peripheral devices, using shared peripheral interrupt (SPI) vectors. The method includes determining whether a message signaled interrupt (MSI) needs to be allocated for a PCI-e device for an interrupt to be sent to a host. If it is determined that MSI needs to be allocated for the PCI-e device, a determination is made as to whether a Locality Specific Interrupt (LPI) register or an Interrupt Translation Service (ITS) is available to process the interrupt. If it is determined that neither the LPI register nor the Interrupt Translation Service (ITS) is available to process the interrupt, the PCI-e device is configured for SPI-based MSI generation to route the interrupt by determining an available SPI vector and assigning the available SPI vector to the PCI-e device.

In such a manner, when MSI for some reason cannot be provided by LPI vectors, either through ITS or direct LPI injection, MSI can be configured to trigger SPI vectors, given a set of available SPI vectors. Available SPI vectors are defined to be those vectors which are not used by any part of the computer system. Simplistically, these are vectors that are not wired up to any SoC/internal devices, but in practice this includes vectors that are at a present time not configured by the combination of device and device driver (that is, it can include vectors dedicated to unused or unsupported devices).

Further aspects include, without limitation, a non-transitory computer-readable storage medium that includes instructions for a processor to carry out the above method, and a computer system that includes a processor programmed to carry out the above method.

DETAILED DESCRIPTION

Figure 2:
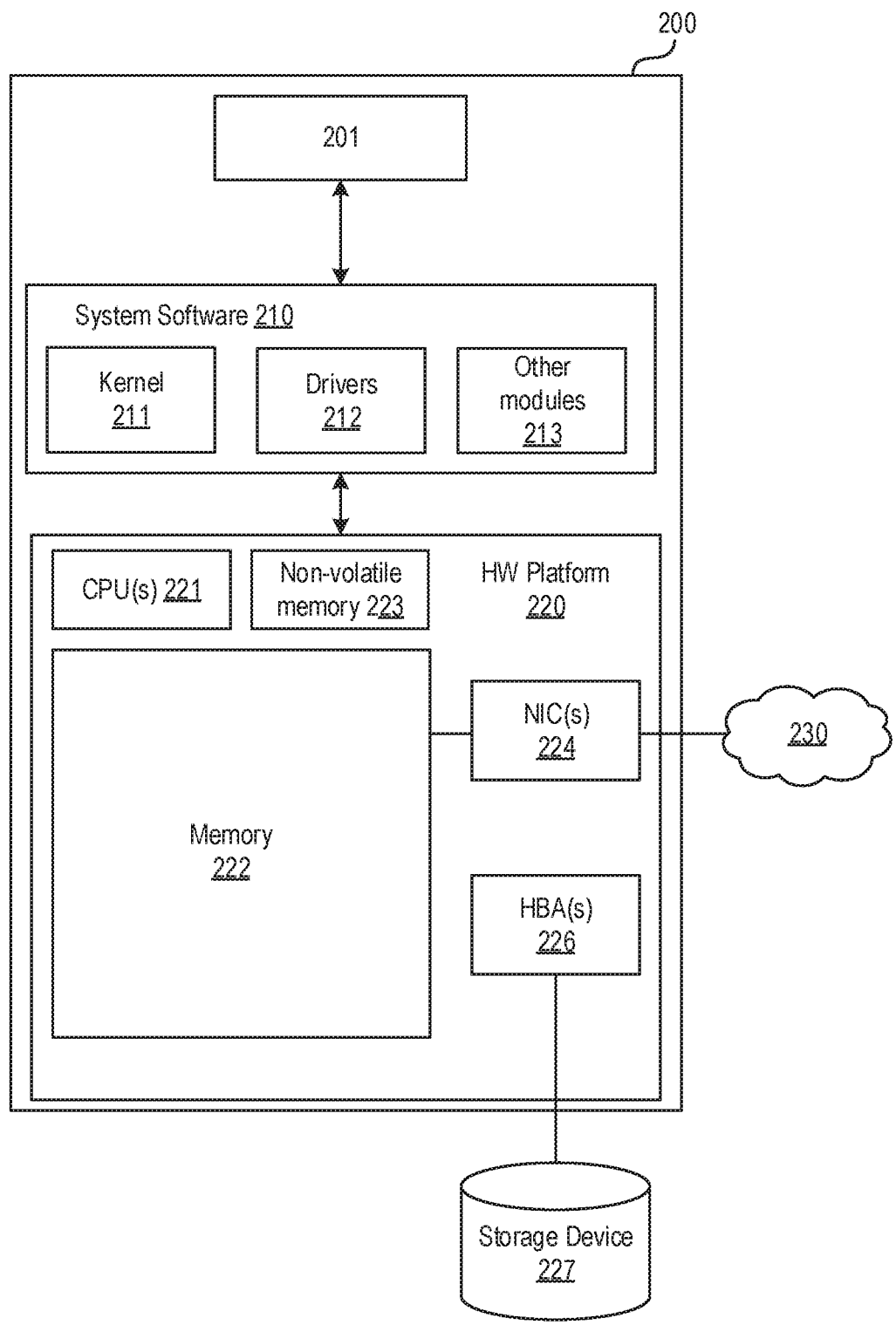
FIG. 2 is a block diagram of a computer system in which one or more embodiments may be implemented.

FIG. 2 is a block diagram of a computer system 200 in which one or more embodiments may be implemented. Computer system 200 includes one or more applications 201 that are running on top of system software 210. System software 210 includes a kernel 211, drivers 212 and other modules 213 that manage hardware resources provided by a hardware platform 220. In one embodiment, system software 210 is an operating system (OS), such as operating systems that are commercially available. In another embodiment, system software 210 is a hypervisor that supports virtual machine applications running thereon, e.g., a hypervisor that is included as a component of VMware's vSphere® product, which is commercially available from VMware, Inc. of Palo Alto, Calif. Hardware platform 220 includes one or more physical central processing units (pCPUs) 221, system memory 222 (e.g., dynamic random access memory (DRAM)), read-only-memory (ROM) 223, one or more network interface cards (NICs) 24 that connect computer system 200 to a network 230 such as the Internet, and one or more host bus adapters (HBAs) 226 that connect to storage device(s) 227, which may be a local storage device or provided on a storage area network. In the descriptions that follow, pCPU denotes either a processor core, or a logical processor of a multi-threaded physical processor or processor core if multi-threading is enabled.

In the embodiments illustrated herein, computer system 200 is configured in accordance with the unified extensible firmware interface (UEFI) specification, has a PCI-e bus for communication amongst components of the computer system, and uses the GICv3 or GICv4 specification for interrupt handling.

In cases where there is a problem with an LPI implementation for handling MSIs, or when there is a problem with ITS, SPIs may be used in one embodiment to receive and route MSIs from one or more components of the computer system. An SPI is generally a dedicated "wire" interrupt for an internal peripheral, however GICv3 allows an SPI interrupt to be raised by writing the vector value to the GIC distributor SETSPI register (allowing both software to simulate the arrival of SPIs but also for MSIs to be implemented with SETSPI as the target). According to the GICv3 specification, interrupt identifiers in the range of 32-1020 may be allocated for use as SPIs, whereby SPIs may be used to signal interrupts from various peripherals accessible across the entire computer system.

SPIs may be shared between processors or cores of a computer system, and may be triggered directly by software (e.g. for inter-processor signaling), by hardware (e.g., peripherals such as integrated USB or SATA controllers— wired directly to the GIC distributor, or by message writes to SETSPI for GICv3 systems)

Figure 3:
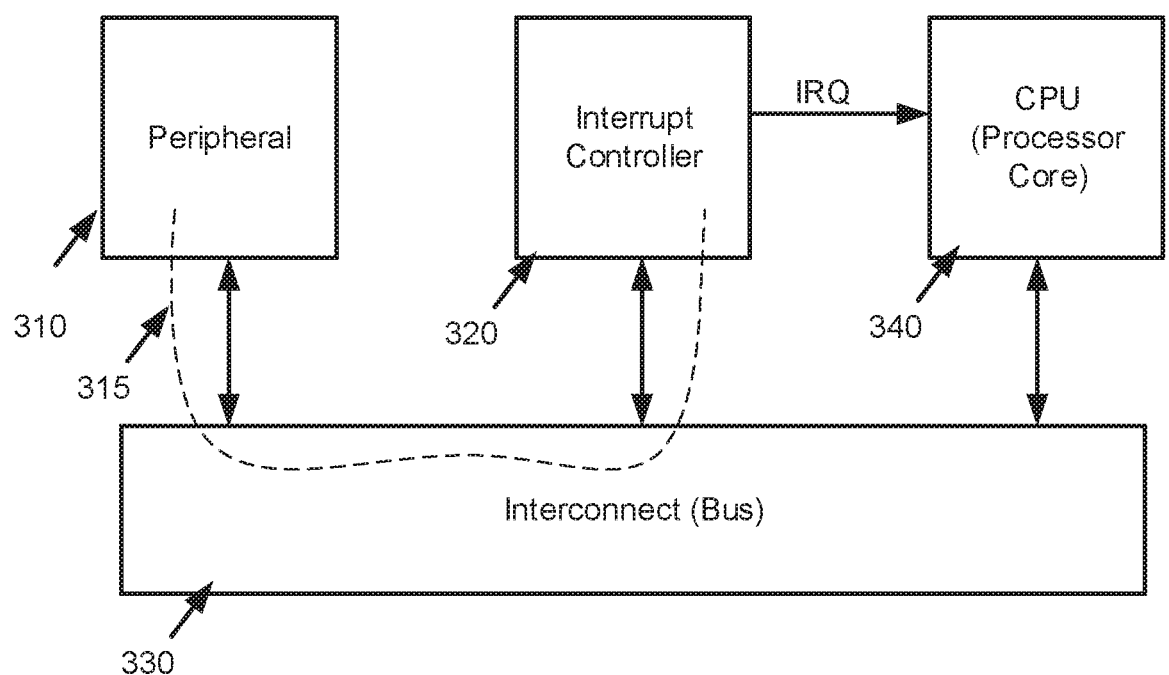
FIG. 3 is a block diagram showing how a message-based interrupt (MSI) may be transported from a peripheral that generated the interrupt to a host.

FIG. 3 shows how a message-based interrupt (MSI) is transported from a peripheral that generated the interrupt, to a processing element that will perform some action due to receipt of the interrupt (e.g., a processor core). In particular, a MSI is set by a peripheral 310 writing to a register of an interrupt controller 320. The interrupt message is sent by the peripheral via an interconnect (bus) 330, and is received by interrupt controller 320, which then informs a processing element 340, such as a processor core or pCPU, of the edge interrupt, via an Interrupt Request (IRQ) signal, whereby processing element 340 may then perform a task to resolve the interrupt. The path that the interrupt message takes is shown by way of a dashed line 315 in FIG. 3. Once the interrupt is resolved, processing element 340 or peripheral 310 may clear the interrupt by sending an end-of-interrupt acknowledgment to the interrupt controller 320.

According to one embodiment, the SPI injection capability present in GICv3 distributors and redistributors may be used to send interrupts to appropriate components of a computer system when LPI capability is not currently available, such as when ITS is not operational for some reason and there is no direct LPI injection. According to the GICv3 specification, there are up to 987 available SPI interrupt identifiers, between vector 32 and vector 1019, whereby each interrupt source is identified by an vector number. This is set forth in the GICv3 specification, section 3.1.2. The actual number may be less than 987, based on certain vectors reserved for other services or for secure interrupts sent by secure components of a computer system, for example. However, there should usually be a sufficient number of available vectors for assigning to the various components making up a typical computer system, to accommodate SPIs.

As such, according to at least one aspect, SPIs are used instead of LPIs to implement MSI, in situations where LPIs cannot be used, with an SPI vectors assigned to each MSI interrupt allocated for a PCIe device. After having assigned SPI vectors for each allocated MSI interrupt for a PCIe device, the SPIs need to be further configured to enable their use in this manner. In more detail, SPIs are configured through a Distributor as set forth in the GICv3 specification, using GICD_* registers, in which the target of the interrupt (e.g., which one or more of four cores of a four-core computer system) is configured via information stored in a GICD_IROUTERn register, in which there is one GICD_IROUTERn register per SPI. That information may include a routing policy that controls the routing mode (e.g., which core or cores that the Distributor is to deliver the interrupt to). Further details of the appropriate CPU routing for SPIs is not described herein for the sake of brevity, but is something that can be readily performed by a person skilled in the art.

Figure 1:
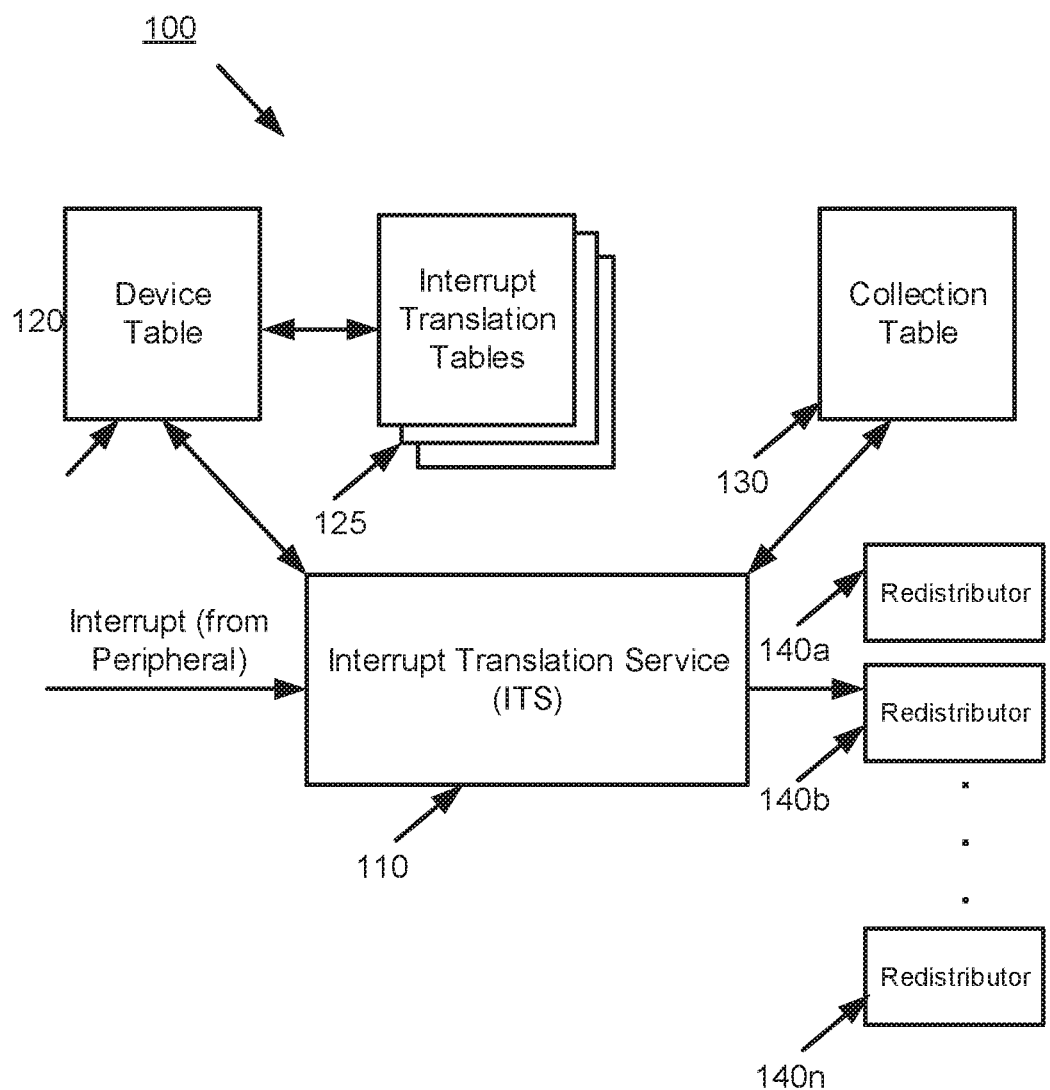
FIG. 1 is a block diagram of an interrupt processing system in which one or more embodiments may be implemented.
Figure 4:
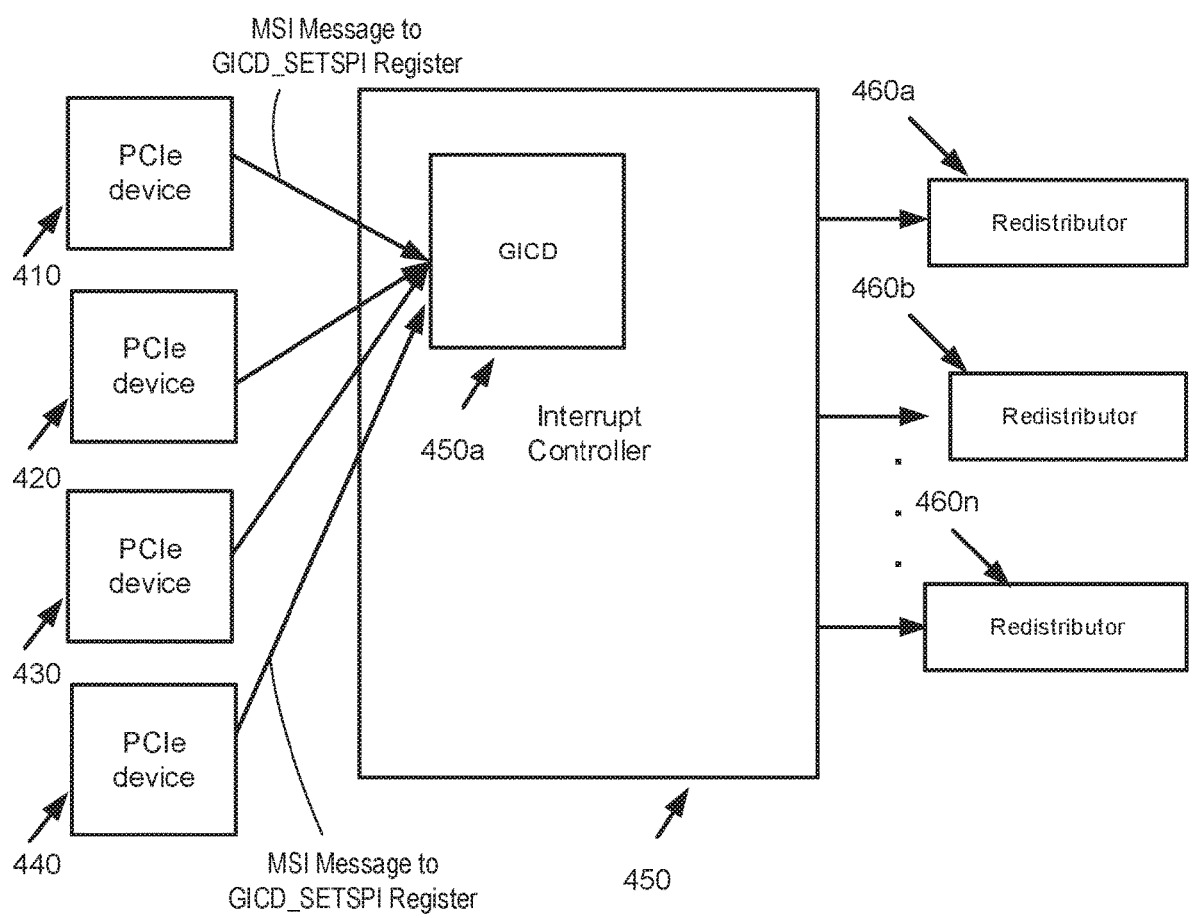
FIG. 4 is a block diagram showing how shared peripheral interrupts (SPIs) may be transported from a computer component that generated the interrupt to a host using an MSI.

The PCIe device configured for MSI is programmed with the I/O address of the GIC distributor SETSPI register, such that the chosen SPI vectors are triggered when the PCIe devices raises an MSI. FIG. 4 shows one possible configuration, in which computer components 410, 420, 430 and 440 are PCIe devices configured for MSI, and using SETSPI to trigger the allocated vectors on interrupt controller distributor (GICD) 450a. Interrupt controller 450 then determines which computer component (e.g., which processor core of a multi-core processor) the interrupt may be distributed to processor cores (not shown in FIG. 4) via redistributors 460a, 460b, . . . , 460n, in a manner analogous to the operation of the redistributors 140a, 140b, . . . , 140n as shown in FIG. 1.

Figures 5, 6:
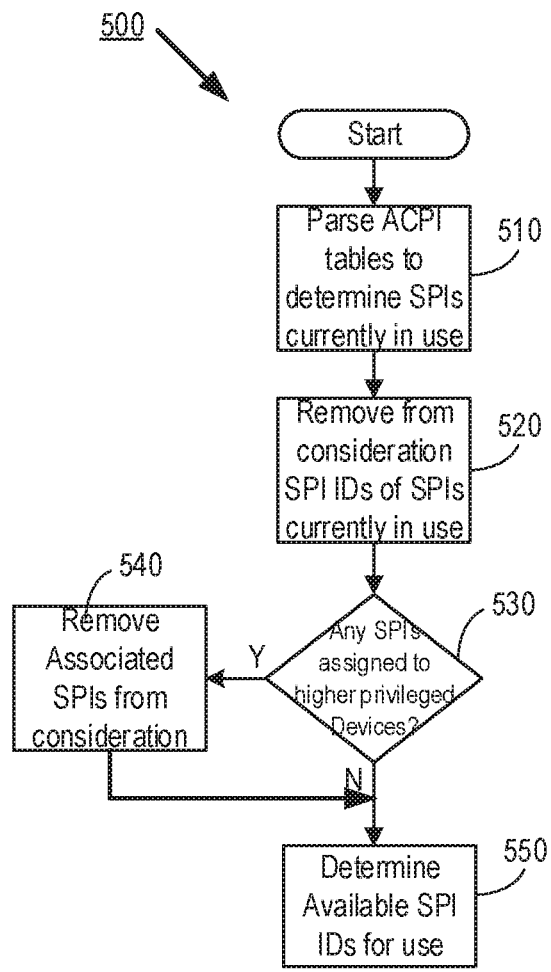
FIG. 5 is a flow diagram of a method for determining available SPIs that may be used to process MSI interrupts when LPIs cannot be used for PCI-e devices, according to one or more embodiments.
FIG. 6 shows exemplary pseudo-code for determining whether an SPI is controlled by a higher privileged device driver, according to one or more embodiments.

FIG. 5 is a flow chart showing a method 500 for determining available SPIs that may be used to process interrupts when LPIs cannot be used for PCI-e devices, according to at least one aspect. In particular, SPI vectors in use by other active and operational devices cannot be used, because of a sharing conflict—vectors that are level-triggered have the wrong configuration, while edge-triggered vectors cannot be shared safely by OS and driver code that expects no sharing (even though, unlike x86, sharing edge vectors is hypothetically possible because of the extra active-and-pending state on the GIC for an interrupt vector). Some SPI vectors may be for devices, whose interrupts are routed to a higher privileged device driver, such code operating at priority level EL3. Such vectors are additionally not usable for MSI, because they will never be received by the OS running with a privilege lower than priority level EL3, and triggering them can cause a faulting condition and system instability.

In one embodiment, in order to find out which SPIs are currently in use and not available for use as an MSI backup when MSI is not currently operational, the interrupt controller parses, in step 510, boot firmware tables, i.e., Advanced Configuration and Power Interface (ACPI) tables or other types of boot tables such as those used for Basic Input/Output System (BIOS) booting of a computer, to determine which SPI interrupts are currently being made. ACPI is an industry standard that describes the bus-less devices through a DSDT "devices" table (differentiated system description table), which defines a tree of devices through an interpreted language called AML (ACPI Machine Language) that corresponds to byte-code. For each bus-less device defined therein, the DSDT contains a descriptor that describes the device's fixed memory-mapped input-output (MMIO) ranges and interrupt vectors used, as well as its hardware identifier (_HID) and compatible identifier (_CID). The SSDT (Secondary System Descriptor Table) is an ACPI table that is a supplement to the DSDT, and includes information related to interrupt controllers used in the computer system. The IORT (I/O Remapping Table) includes information describing how various components are connected together, and how those components that need identification reserve values in the appropriate identification space. In particular, the IORT provides an ACPI description for IO topology, System Memory Management Units (SMMUs), and ITSs.

Based on the information in the ACPI tables, which may be used to determine which interrupts are assigned to which devices, the interrupt controller removes, in step 520 that follows step 510, the SPI vectors assigned to those devices from the list of available SPI vectors in the system. By way of example, interrupts described in the ACPI tables mentioned above are assigned to specific devices, such as a mouse being moved on a computer monitor generating an interrupt to the CPU. For such interrupts described in the ACPI tables, if the OS or the hypervisor for a virtualization machine has a driver for those specific devices, then the SPI vector assigned to those specific devices would be constantly firing with interrupts, thereby making it not a useful SPI vector to assign to a device seeking to output an MSI interrupt via SPI instead of via LPI.

The interrupt controller determines, in step 530 that follows step 520, whether there are any computer devices or SoCs, which are hidden from the information in the ACPI tables, having interrupts that are routed to secure mode firmware, such as interrupts routed to a Trust Zone. This is because an Operating System (OS) or a Hypervisor (for a virtual machine) that is running on the computer system is set at a particular priority level, referred to as EL2, or Level 2. However, other devices on the computer system may be set at a higher privilege level, such as EL3, or Level 3. Such devices at EL3, which may be operating in a secure mode, are hidden from the EL2 devices, and thus are hidden from the OS or the Hypervisor (for a virtual machine). Such EL3 devices generate secure interrupts at EL3 level, which are essentially hidden from the information in the ACPI tables used by the OS or the Hypervisor.

The determining in step 530 whether an SPI vector is currently being used by an EL3 or higher device may be accomplished by attempting to set a priority value to an SPI vector, such as to attempting to set priority value 2 to SPI vector 55, and then checking to see if the priority value of SPI vector 55 is equal to 2. If it is not equal to 2, then that vector is not being used by an EL3 or higher device and thus that vector is available for use as a possible SPI vector. But if the priority value is set to a value not equal to 2, such as being equal to zero (and thus the attempted setting of the priority value 2 to the vector was not allowed due to the SPI being assigned to a higher priority device), that vector is removed as a possible SPI vector. FIG. 6 shows pseudo-code 600 that may be used to attempt to set a priority level for an SPI to a predetermined value, and to determine whether or not the priority level for the SPI was set to the predetermined value.

Referring back to FIG. 5, the interrupt controller removes, in step 540 that follows step 530, the any SPIs assigned to higher priority devices from consideration as SPI vectors.

The interrupt controller obtains, in step 550 that follows step 540, based on the number of SPI vectors assigned to higher priority devices as obtained in step 540, and the number of SPI vectors currently in use, a set of available SPI vectors, for use in receiving and routing interrupts that could not for some reason be sent via MSIs.

Figure 7:
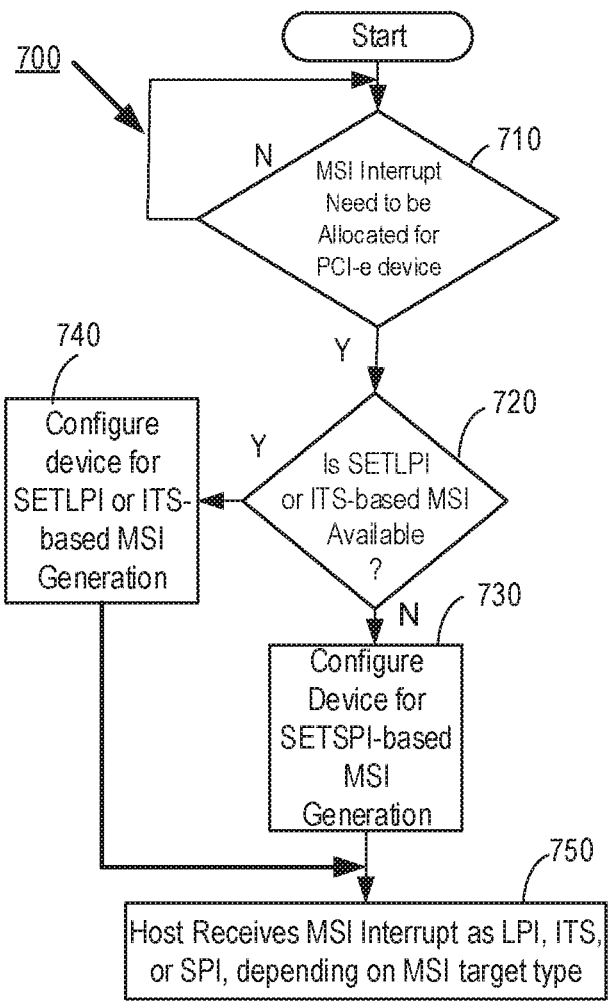
FIG. 7 is a flow diagram of a method for configuring a PCIe device for the appropriate MSI target (LPI, ITS, or SPI), and sending/processing MSI either via LPI, via ITS, or via SPI, according to one or more embodiments.

FIG. 7 is a flow diagram of a method 700 for sending MSIs either via LPI or via SPI when LPI is not operational, according to one or more embodiments. The method may be used, by way of example, for an ARM®-based computer system having a PCI-e bus for distributing interrupt signals and messages in accordance with a GICv3 standard from a plurality of PCIe devices. The interrupt controller determines, in step 710, whether an MSI interrupt needs to be allocated for a PCIe device. If Yes, the interrupt controller allocates an MSI interrupt, in steps 720, 730, 740 that follows step 710, using an available shared peripheral interrupt (SPI) vector in a case where LPI capability is not feasible, and using LPI in cases where LPI capability is feasible.

In more detail, the interrupt controller determines, in step 720, if SETLPI or ITS-based MSI is available. If the result of the determination in step 720 is Yes, then the method flows to step 740, to configure the PCIe device for MSI generation using ITS or LPI direct injection, as appropriate.

If the determination made in step 720 is No, then the method flows to step 730, to configure the PCIe for MSI generation using SPI injection that uses the GIC Distributor SETSPI register.

The host (e.g., pCPU) receives, in step 750, the SPI MSI (output from step 730) or the LPI or ITS-based MSI (output from step 740), and acts on it accordingly.

The various embodiments described herein may employ various computer-implemented operations involving data stored in computer systems. For example, these operations may require physical manipulation of physical quantities. Usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system-computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), a CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of handling message signaled interrupts in a computer system that uses an internal bus for communication between peripheral devices, using shared peripheral interrupt (SPI) vectors, the method comprising:
   determining whether a message signaled interrupt (MSI) needs to be allocated for a PCI-e device for an interrupt to be sent to a host;
   when it is determined that MSI needs to be allocated for the PCI-e device, determining that neither a Locality Specific Interrupt (LPI) register nor an Interrupt Translation Service (ITS) is available to configure the PCI-e device for LPI or ITS-based MSI generation; and
   upon determining that neither the LPI register nor the Interrupt Translation Service (ITS) is available to process the interrupt, determining an available SPI vector and configuring the PCI-e device for SPI-based MSI generation by assigning the available SPI vector to the PCI-e device.

2. The method of claim 1, further comprising:
   sending the interrupt to the host via the SPI-based MSI generation in which, when the PCI-e device creates an MSI, the MSI is programmed with an address of an SPI register to cause triggering of an SPI vector when the MSI is received by the SPI register.

3. The method of claim 1, further comprising:
   when it is determined that the ITS is available to process the interrupt, configuring the PCI-e device for ITS-based MSI generation.

4. The method of claim 1, wherein, when it is determined that neither the LPI register nor the Interrupt Translation Service (ITS) is available to process the interrupt, the method further comprising:
   determining whether an SPI vector is assigned as a higher-privileged SPI vector;
   when it is determined that the SPI vector is assigned as a higher-privileged SPI vector, determining that the SPI vector is not available to be assigned to the PCI-e device for SPI-based MSI generation.

5. The method of claim 1, wherein, when it is determined that neither the LPI register nor the Interrupt Translation Service (ITS) is available to process the interrupt, the method further comprising:
   determining whether an SPI vector is assigned as a higher-privileged SPI vector;
   when it is determined that the SPI vector is not assigned as a higher-privileged SPI vector, determining that the SPI vector is available and assigning the SPI vector to the PCI-e device for SPI-based MSI generation.

6. The method of claim 5, wherein determining whether an SPI vector is assigned as a higher-privileged vector comprises determining whether a priority level assigned to the SPI vector is set to a predetermined value.

7. The method of claim 6, wherein, when the priority level assigned to the SPI vector is set to the predetermined value, determining that the SPI vector is a higher-privileged SPI vector that is not assignable to the PCI-e device for SPI-based MSI generation; and
   when the priority level assigned to the SPI vector is not set to the predetermined value, determining that the SPI vector is not a higher-privileged SPI vector that is assignable to the PCI-e device for SPI-based MSI generation.

8. A non-transitory computer readable medium comprising instructions for handling interrupts in a computer system that uses an internal bus for communication between peripheral devices, using shared peripheral interrupt (SPI) vectors, wherein the instructions, when executed by a processor, cause the processor to perform the steps of:
   determining whether a message signaled interrupt (MSI) needs to be allocated for a PCI-e device for an interrupt to be sent to a host;
   when it is determined that MSI needs to be allocated for the PCI-e device, determining whether that neither a Locality Specific Interrupt (LPI) register nor an Interrupt Translation Service (ITS) is available to configure the PCI-e device for LPI or ITS-based MSI generation; and
   when it is determined that neither the LPI register nor the Interrupt Translation Service (ITS) is available to process the interrupt, determining an available SPI vector and configuring the PCI-e device for SPI-based MSI generation by assigning the available SPI vector to the PCI-e device.

9. The non-transitory computer readable medium of claim 8, wherein the instructions, when executed by a processor, further cause the processor to perform the step of:
   sending the interrupt to the host via the SPI-based MSI generation in which, when the PCI-e device creates an MSI, the MSI is programmed with an address of an SPI register to cause triggering of an SPI vector when the MSI is received by the SPI register.

10. The non-transitory computer readable medium of claim 8, wherein the instructions, when executed by a processor, further cause the processor to perform the step of:
    when it is determined that the ITS is available to process the interrupt, configuring the PCI-e device for ITS-based MSI generation.

11. The non-transitory computer readable medium of claim 8, wherein, when it is determined that neither the LPI register nor the Interrupt Translation Service (ITS) is available to process the interrupt, the instructions, when executed by a processor, further cause the processor to perform the steps of:
    determining whether an SPI vector is assigned as a higher-privileged SPI vector;
    when it is determined that the SPI vector is assigned as a higher-privileged SPI vector, determining that the SPI vector is not available to be assigned to the PCI-e device for MSI signaling purposes.

12. The non-transitory computer readable medium of claim 8, wherein, when it is determined that neither the LPI register nor the Interrupt Translation Service (ITS) is available to process the interrupt, the instructions, when executed by a processor, further cause the processor to perform the steps of:
    determining whether an SPI vector is assigned as a higher-privileged SPI vector;
    when it is determined that the SPI vector is not assigned as a higher-privileged SPI vector, determining that the SPI vector is available and assigning the SPI vector to the PCI-e device for MSI signaling purposes.

13. The non-transitory computer readable medium of claim 12, wherein determining whether an SPI vector is assigned as a higher-privileged vector comprises determining whether a priority level assigned to the SPI vector is set to a predetermined value.

14. The non-transitory computer readable medium of claim 13, wherein, when the priority level assigned to the SPI vector is set to the predetermined value, determining that the SPI vector is a higher-privileged SPI vector that is not assignable to the PCI-e device for MSI signaling purposes; and when the priority level assigned to the SPI vector is not set to the predetermined value, determining that the SPI vector is a higher-privileged SPI vector that is assignable to the PCI-e device for MSI signaling purposes.

15. A computer system, comprising:

an internal bus;

a plurality of peripheral devices communicable with each other via the internal bus; and a processor configured to carry out the steps of:

determining whether a message signaled interrupt (MSI) needs to be allocated for a PCI-e device for an interrupt to be sent to a host;

when it is determined that MSI needs to be allocated for the PCI-e device, determining that neither a Locality Specific Interrupt (LPI) register nor an Interrupt Translation Service (ITS) is available to process the interrupt; and when it is determined that neither the LPI register nor the Interrupt Translation Service (ITS) is available to process the interrupt, configuring the PCI-e device for SPI-based MSI generation to route the interrupt by assigning an available SPI vector to the PCI-e device.

16. The computer system of claim 15, wherein the processor is further configured to carry out the step of:

sending the interrupt to the host via the SPI-based MSI generation in which, when the PCI-e device creates an MSI, the MSI is programmed with an address of an SPI register to cause triggering of an SPI vector when the MSI is received by the SPI register.

17. The computer system of claim 15, wherein the processor is further configured to carry out the step of:

when it is determined that the ITS is available to process the interrupt, configuring the PCI-e device for ITS-based MSI generation.

18. The computer system of claim 15, wherein, when it is determined that neither the LPI register nor the Interrupt Translation Service (ITS) is available to process the interrupt, the processor is further configured to carry out the steps of:

determining whether an SPI vector is assigned as a higher-privileged SPI vector;

when it is determined that the SPI vector is assigned as a higher-privileged SPI vector, determining that the SPI vector is not available to be assigned to the PCI-e device SPI-based MSI generation.

19. The computer system of claim 15 wherein, when it is determined that neither the LPI register nor the Interrupt Translation Service (ITS) is available to process the interrupt, the processor is further configured to carry out the steps of:

determining whether an SPI vector is assigned as a higher-privileged SPI vector;

when it is determined that the SPI vector is not assigned as a higher-privileged SPI vector, determining that the SPI vector is available and assigning the SPI vector to the PCI-e device SPI-based MSI generation.

20. The computer system of claim 19, wherein determining whether an SPI vector is assigned as a higher-privileged vector comprises determining whether a priority level assigned the SPI vector is set to a predetermined value.

* * * * *